US006792033B1

(12) United States Patent
Maruta et al.

(10) Patent No.: US 6,792,033 B1
(45) Date of Patent: Sep. 14, 2004

(54) ARRAY ANTENNA RECEPTION APPARATUS

(75) Inventors: Yasushi Maruta, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/388,509

(22) Filed: Sep. 2, 1999

(30) Foreign Application Priority Data

Sep. 3, 1998 (JP) .......................................... 10/250064

(51) Int. Cl.[7] ................................................ H04B 1/707
(52) U.S. Cl. ...................................... 375/148; 375/347
(58) Field of Search ................................ 375/148, 347, 375/349, 346, 267, 147; 342/359, 368, 373; 343/835; 455/562.1

(56) References Cited

U.S. PATENT DOCUMENTS 4,748,682 A 5/1988 Fukae et al.
5,410,321 A * 4/1995 Gordon et al. .............. 342/374
5,548,813 A 8/1996 Charas et al.
5,686,926 A * 11/1997 Kijima et al. ............... 342/373
5,745,858 A * 4/1998 Sato et al. .................. 455/138
5,748,683 A 5/1998 Smith et al.
5,757,845 A * 5/1998 Fukawa et al. ............. 375/152
6,073,032 A * 6/2000 Keskitalo et al. ........ 455/277.1
6,188,913 B1 2/2001 Fukagawa et al.
6,192,066 B1 * 2/2001 Asanuma .................... 375/148

FOREIGN PATENT DOCUMENTS

EP 0715478 6/1996
EP 0744841 11/1996
EP 0 949 769 A1 10/1999
JP 10-051215 2/1998
JP 10-68751 3/1998
JP 10-98324 4/1998

OTHER PUBLICATIONS

Patent Abstracts of Japan, vol. 1998, No. 11, Sep. 30, 1998 and JP 10–174160 A (NTT Ido Tsushinmo KK), Jun. 26, 1993 *abstract*.
Patent Abstracts of Japan, vol. 1996, No. 06, Jun. 28, 1996 & JP 08–032347 A (Nippon Ido Tsushin KK: others: 01), Feb. 2, 1996, *abstract*.
European Search Report issued Oct. 24, 2000 in a related application (English).

* cited by examiner

*Primary Examiner*—Don N. Vo
(74) *Attorney, Agent, or Firm*—Dickstein, Shapiro, Morin & Oshinsky, LLP

(57) ABSTRACT

An array antenna reception apparatus includes an array antenna, K adaptive receivers, and demodulated signal synthesizer. The array antenna has M (M is an integer of 1 or more) antenna elements linearly laid out on each side (sector) of a polygon having K (K is an integer of 3 or more) sides. Each adaptive receiver receives reception signals from the M antenna elements for a corresponding sector, independently forms a directional pattern having a gain in a desired signal direction for the sector, receives a desired signal, and suppresses an interference signal. The demodulated signal synthesizer receives K demodulated signals as outputs from the K adaptive receivers, weights and synthesizes the signals, and outputs a demodulated signal for a user.

14 Claims, 6 Drawing Sheets

ARRAY ANTENNA RECEPTION APPARATUS

BACKGROUND OF THE INVENTION

1. Field of the Invention

The present invention relates to an array antenna reception apparatus installed in a base station for removing another user interference under antenna directivity control and, more particularly, to an array antenna having antenna elements linearly laid out on each side of a polygon.

2. Description of the Prior Art

In a cellular mobile communication system and the like, the following method is examined. A directional pattern which maximizes the reception gain in a desired signal arrival direction is formed using an adaptive antenna made up of a plurality of antenna elements, and interference from another user and interference by a delayed wave are removed in reception. As a radio transmission method expected for a large subscriber capacity, the CDMA method receives a great deal of attention.

FIG. 1 is a block diagram showing an example of a conventional array antenna reception apparatus using the CDMA method.

The conventional array antenna reception apparatus is constituted by an antenna 20 having a plurality of antenna elements $\mathbf{21}_1$ to $\mathbf{21}_M$ laid out circularly, one adaptive receiver 22, and a determination circuit 5.

The antenna 20 is made up of the M antenna elements $\mathbf{21}_1$ to $\mathbf{21}_M$ laid out circularly. Each of the antenna elements $\mathbf{21}_1$ to $\mathbf{21}_M$ is not particularly limited in horizontal plane directivity and may take omnidirectivity or dipole directivity. The M antenna elements $\mathbf{21}_1$ to $\mathbf{21}_M$ are close to each other so as to establish correlations between antenna reception signals, and receive signals obtained by code-multiplexing a desired signal and a plurality of interference signals. In the following processing, since signals are digitally processed in the baseband, M antenna reception signals $S_1$ to $S_M$ are frequency-converted from the radio band to the baseband and A/D-converted.

The determination circuit 5 receives a demodulated signal for a user as an output from the adaptive receiver 22 and performs hard determination for the demodulated signal, thereby outputting a user determination symbol. Here, it should be noted that only one of the determination circuit 5 is shown in FIG. 1, but other circuits are omitted.

FIG. 2 is a block diagram showing the adaptive receiver 22 in the conventional array antenna reception apparatus.

The adaptive receiver 22 is constituted by despread circuits $\mathbf{6}_1$ to $\mathbf{6}_M$, weighting synthesizer 7, demodulator 10, complex multiplier 13, subtracter 14, delay circuit 15, and antenna weight control circuit 16. The adaptive receiver 22 receives the antenna reception signals $S_1$ to $S_M$ received by the M antenna elements $\mathbf{21}_1$ to $\mathbf{21}_M$ laid out circularly, and the user determination symbol as an output from the determination circuit 5, and outputs a demodulated signal for a user.

The despread circuits $\mathbf{6}_1$ to $\mathbf{6}_M$ calculate correlations between the antenna reception signals $S_1$ to $S_M$ and a user spread code C. Assuming that the spread code C is a complex code made up of two quadrature codes $C_I$ and $C_Q$, the despread circuits $\mathbf{6}_1$ to $\mathbf{6}_M$ can be realized by one complex multiplier and averaging circuits over the symbol section. The despread circuits $\mathbf{6}_1$ to $\mathbf{6}_M$ can also be realized by a transversal filter arrangement with a tap weight C.

The weighting synthesizer 7 comprises complex multipliers $\mathbf{8}_1$ to $\mathbf{8}_M$ and adder 9. The weighting synthesizer 7 multiplies outputs from the despread circuits $\mathbf{6}_1$ to $\mathbf{6}_M$ by antenna weights $W_{r1}$ to $W_{rM}$, and adds them to generate a signal received with a directional pattern unique to a desired signal.

The demodulator 10 comprises a transmission path estimation circuit 11 and complex multiplier 12. The product of an output from the weighting synthesizer 7 and the complex conjugate of a transmission path estimation output is the demodulated signal for a user as an output from the adaptive receiver 22.

The complex multiplier 13 multiplies the user determination symbol by the transmission path estimation output. In multiplying the user determination symbol by the transmission path estimation output, only a component about the phase of the estimation value can be multiplied, and an amplitude obtained by another means can be multiplied. This another means is one for obtaining the amplitude by measuring reception power or the like.

The subtracter 14 calculates the difference between an output from the complex multiplier 13 and an output from the weighting synthesizer 7, and detects an antenna weight control error e.

The delay circuit 15 delays outputs from the despread circuits $\mathbf{6}_1$ to $\mathbf{6}_M$ in accordance with the processing times of the weighting synthesizer 7, demodulator 10, subtracter 14, and the like.

The antenna weight control circuit 16 calculates the antenna weights $W_{r1}$ to $W_{rM}$ from the antenna weight control error e and outputs from the delay circuit 15. The antenna weight control circuit 16 adaptively controls the antenna weights $W_{r1}$ to $W_{rM}$ based on the MMSE standard so as to minimize the mean square value of the antenna weight control error e. When the LMS algorithm is employed as an update algorithm with a small arithmetic amount, the antenna weights $W_{r1}$ to $W_{rM}$ are given by $$W_r(i+1)=W_r(i)+\mu r(i-D_{dem})e^*(i) \quad (1)$$

where $W_r(i)$ (column vector having M elements) is the antenna weight of the ith symbol, r(i) (column vector having M elements) is the antenna reception signal, $\mu$ is the step size, $D_{dem}$ is a delay time given by the delay circuit 15, and * is the complex conjugate. From equation (1), the antenna weights $W_{rl}$ to $W_{rM}$ are updated every symbol. The adaptive control convergence step may use a known symbol instead of the determination symbol.

The M antenna reception signals $S_1$ to $S_M$ contain desired (user) signal components, interference signal components, and thermal noise. Each of the desired signal component and interference signal component contains a multipath component. In general, these signal components arrive from different directions. In forming a reception directional pattern, the conventional array antenna reception apparatus shown in FIG. 1 uses an antenna having antenna elements laid out circularly. Thus, a directional pattern with almost uniform reception gains in all the signal arrival directions can be formed.

However, first, the conventional array antenna reception apparatus shown in FIG. 1 cannot attain a high reception gain proportional to the number of antenna elements.

This is because the directional pattern with almost uniform reception gains in all the signal arrival directions is formed by circularly laying out antenna elements, and the reception gain cannot be optimized.

Second, as the number of antenna elements increases, the conventional array antenna reception apparatus shown in FIGS. 1 and 2 decreases in adaptive convergence and stability in forming a directional pattern in the desired user direction.

This is because in the antenna having antenna elements laid out circularly, all the antenna elements must be simultaneously adaptively controlled.

SUMMARY OF THE INVENTION

The present invention has been made in consideration of the above situation in the prior art, and has as its object to provide an array antenna reception apparatus which can attain a high reception gain proportional to the number of antenna elements and is excellent in adaptive control convergence and stability in forming a directional pattern in the user direction.

To achieve the above object, an array antenna reception apparatus according to the main aspect of the present invention is constituted as follows. Antenna elements are linearly laid out on each side (sector) of a polygon, a directional pattern for suppressing interference with another user or multipath is independently formed for each sector, and weighting synthesis is done between sectors. More specifically, the array antenna reception apparatus comprises an array antenna having M (M is an integer of not less than 1) antenna elements linearly laid out on each side (sector) of a polygon having K (K is an integer of not less than 3) sides, K adaptive receivers each for receiving reception signals from the M antenna elements for a corresponding sector, independently forming a directional pattern having a gain in a desired signal direction for the sector, receiving a desired signal, and suppressing an interference signal, and a demodulated signal synthesizer for receiving K demodulated signals as outputs from the K adaptive receivers, weighting and synthesizing the signals, and outputting a demodulated signal for a user.

In the present invention, since the antenna elements are linearly laid out every sector, a directional pattern with a high reception gain substantially proportional to the number of antenna elements can be formed in a direction perpendicular to each straight line (each sector side). Since the directional pattern is independently formed for each sector, the number of antenna elements simultaneously adaptively controlled can be decreased. Even if the number of antenna elements increases, the adaptive convergence and stability are kept high in forming a directional pattern in a desired user direction.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

Several preferred embodiments of the present invention will be described in detail below with reference to the accompanying drawings.

In this case, a multiplexed input signal is a code division multiple signal. The first embodiment will exemplify an array antenna reception apparatus (CDMA adaptive reception apparatus) for the number K (K is an integer of 3 or more) of sides (sectors) of a polygon in an antenna and the number M (M is an integer of 1 or more) of antenna elements in each sector.

Figure 1:
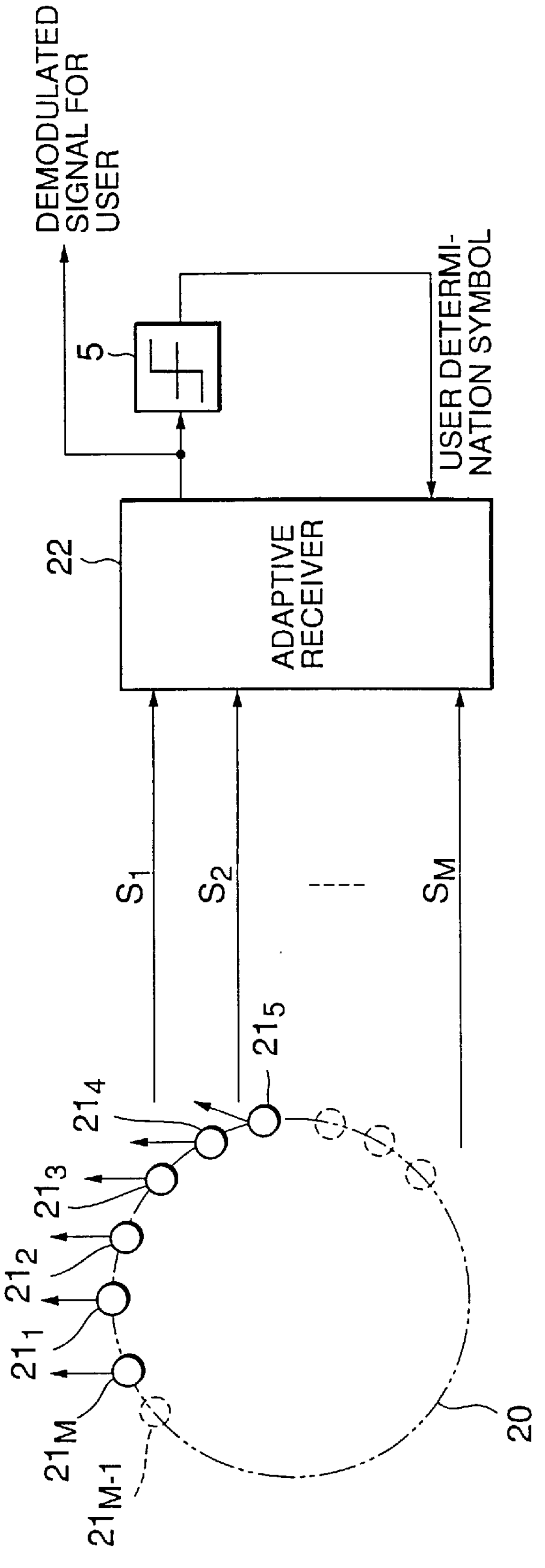
FIG.1 PRIOR ART
FIG. 1 is a block diagram showing the arrangement of a conventional array antenna reception apparatus.
Figure 2:
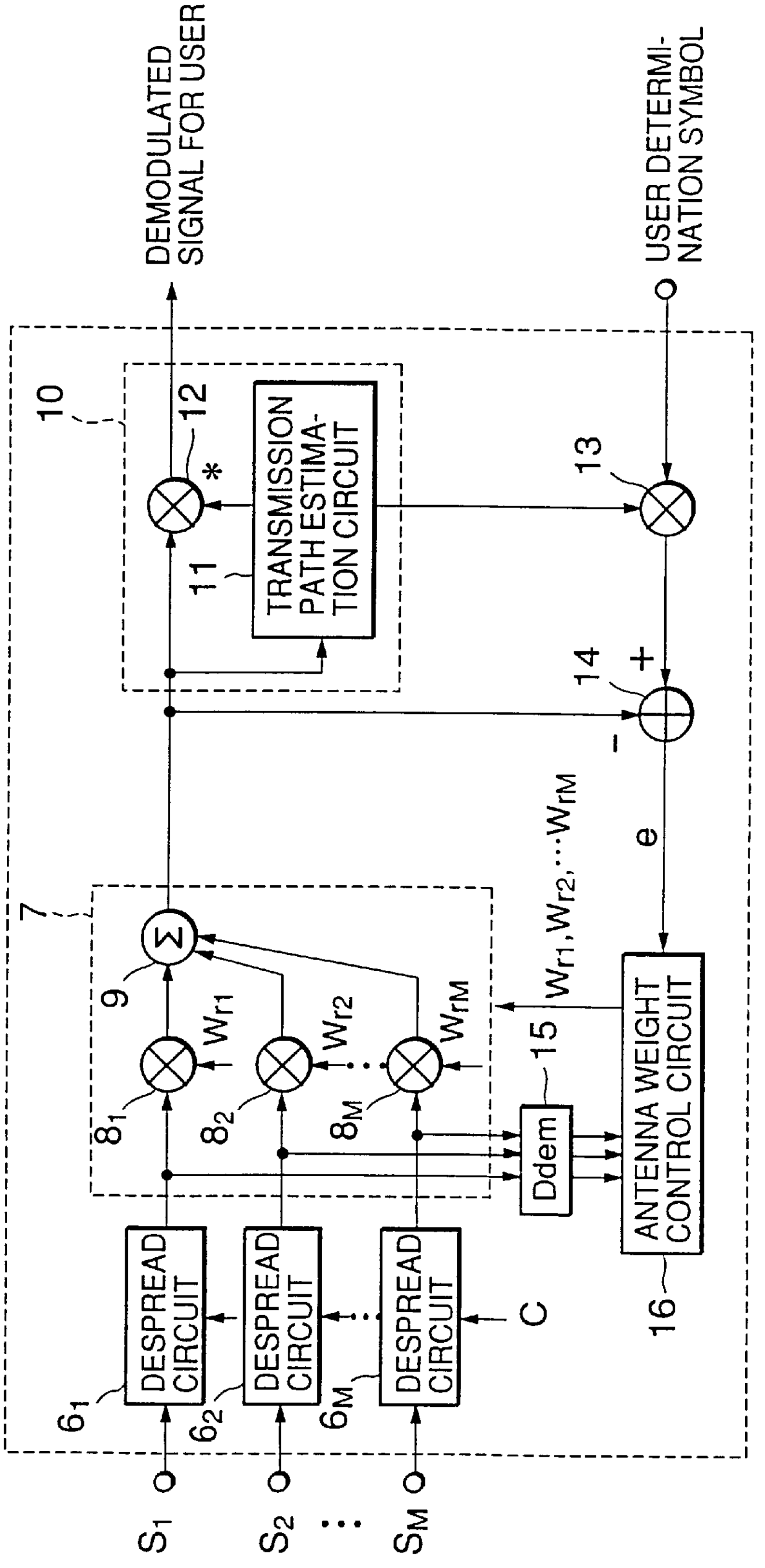
FIG.2 PRIOR ART
FIG. 2 is a block diagram showing the arrangement of an adaptive receiver in the prior shown in FIG. 1.
Figure 3:
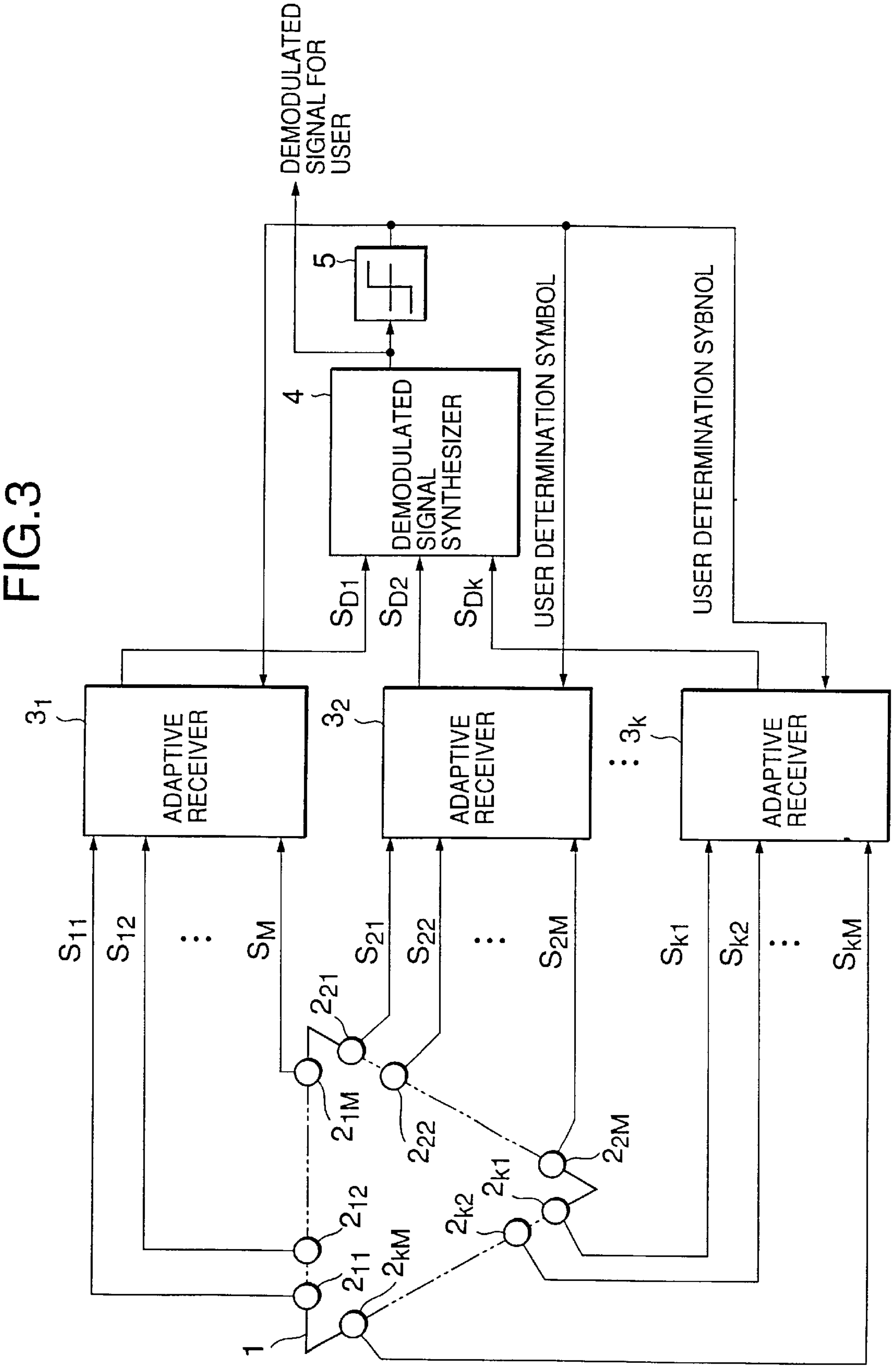
FIG. 3 is a block diagram showing the arrangement of an array antenna reception apparatus according to an embodiment of the present invention.

Referring to FIG. 3, the array antenna reception apparatus according to the first embodiment of the present invention is constituted by an antenna 1 for receiving radio signals to output antenna reception signals ($S_{11}$ to $S_{kM}$), adaptive receivers $\mathbf{3}_1$ to $\mathbf{3}_K$ for receiving the antenna reception signals of corresponding sectors to output demodulated sector signals ($S_{D1}$ to $S_{DK}$) of the corresponding sectors, a demodulated signal synthesizer 4, and a determination circuit 5.

The antenna 1 is made up of antenna elements $\mathbf{2}_{11}$ to $\mathbf{2}_{kM}$ linearly laid out on respective sides (sectors) of a K-side polygon in units of M elements. The kth sector will be mainly described.

The antenna elements $\mathbf{2}_{k1}$ to $\mathbf{2}_{kM}$ in the kth sector are close to each other so as to establish correlations between the antenna reception signals $S_{k1}$ to $S_{kM}$ in the kth sector, and receive signals obtained by code-multiplexing desired signals and a plurality of interference signals. Each of the antenna elements $\mathbf{2}_{k1}$ to $\mathbf{2}_{kM}$ is not particularly limited in horizontal plane directivity, and desirably takes monopole directivity with a beam width of 180° or less. When the antenna elements $\mathbf{2}_{k1}$ to $\mathbf{2}_{kM}$ take monopole directivity with a beam width of 180° or less, they must be arranged to form directivity outside the polygon of the antenna 1. When the antenna elements $\mathbf{2}_{k1}$ to $\mathbf{2}_{kM}$ do not take monopole directivity with a beam width of 180° or less (i.e., omnidirectivity or dipole directivity), a radio shielding member must be disposed inside the K-side polygon of the antenna 1 so as not to receive signals by the antenna elements $\mathbf{2}_{k1}$ to $\mathbf{2}_{kM}$ with directivity inside the kth side (kth sector) of the K-side polygon of the antenna 1. In the following processing, since signals are digitally processed in the baseband, M antenna reception signals k1 to kM received by the antenna elements $\mathbf{2}_{k1}$ to $\mathbf{2}_{kM}$ of the kth sector of the antenna 1 are frequency-converted from the radio band to the baseband and A/D-converted.

The demodulated signal synthesizer 4 receives K demodulated 1st- to kth-sector signals $S_{D1}$ to $S_{DK}$ as outputs from the adaptive receivers $\mathbf{3}_1$ to $\mathbf{3}_K$, weights and synthesizes them, and outputs a demodulated signal for a user. The weighting synthesis method in the demodulated signal synthesizer 4 is not particularly limited, and includes a method of selecting only a demodulated signal having the maximum desired signal power, a method of selecting only a demodulated signal having the maximum ratio (SIR) of desired signal power to interference power, and a maximum ratio synthesizing method of maximizing the ratio of desired signal power to interference power.

The determination circuit 5 receives a demodulated signal for a user as an output from the demodulated signal synthesizer 4 and performs hard determination for the demodulated signal, thereby outputting a user determination symbol. Here, it should be noted that only one of the determination circuit 5 is shown in FIG. 3, but other circuits are omitted.

Figure 4:
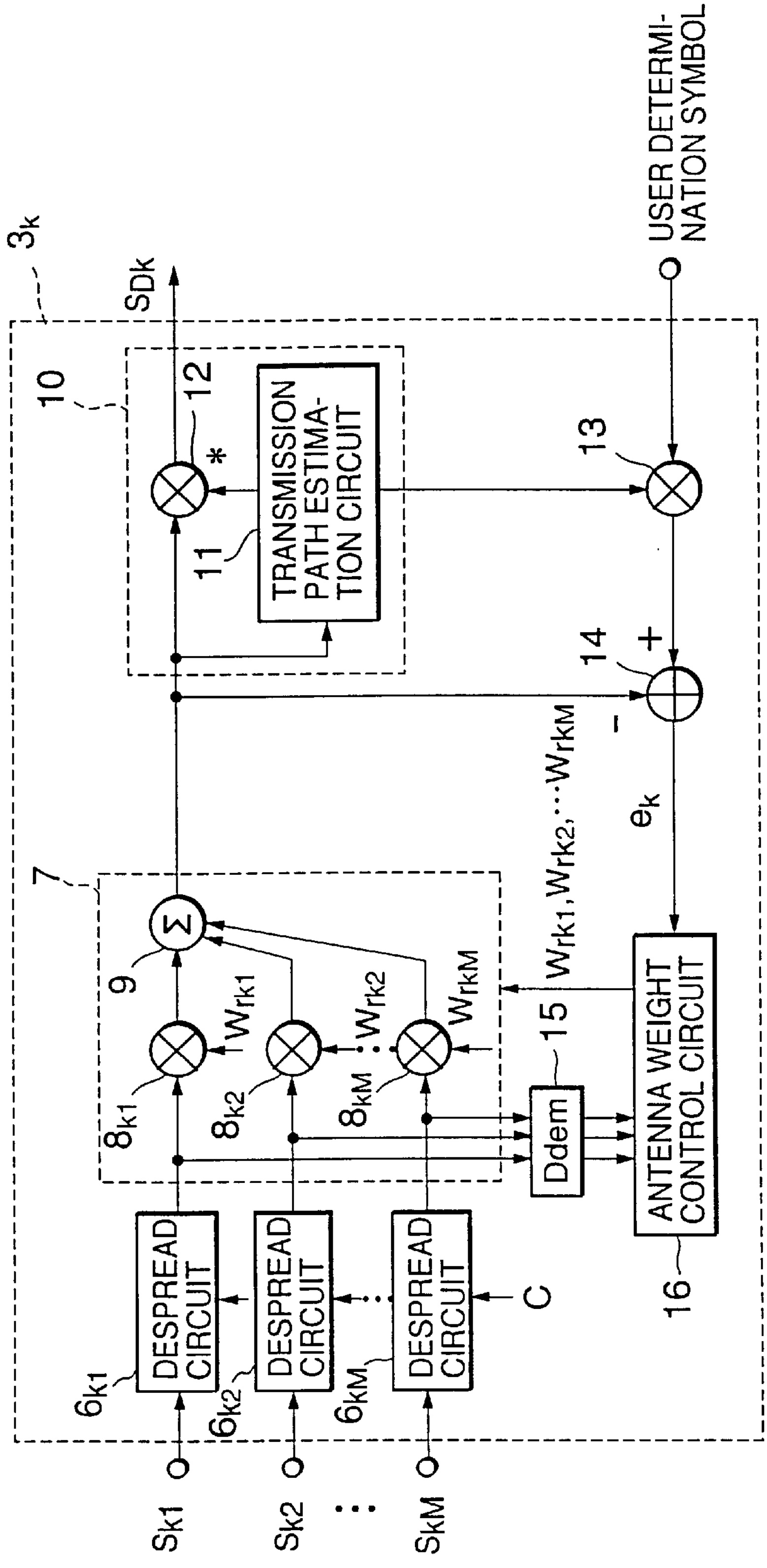
FIG. 4 is a block diagram showing the arrangement of an adaptive receiver in the embodiment shown in FIG. 3.

Referring to FIG. 4, the adaptive receiver $\mathbf{3}_K$ of the kth sector is constituted by despread circuits $\mathbf{6}_{k1}$ to $\mathbf{6}_{kM}$, weighting synthesizer 7, demodulator 10, complex multiplier 13, subtracter 14, delay circuit 15, and antenna weight control circuit 16. The adaptive receiver $3_K$ of the kth sector receives the antenna reception signals k1 to kM received by the M antenna elements $2_{k1}$ to $2_{kM}$ linearly laid out in one sector, and the user determination symbol as an output from the determination circuit 5, and outputs a demodulated kth-sector signal.

The despread circuits $6_{k1}$ to $6_{kM}$ calculate correlations between the antenna signals k1 to kM and a user spread code C. Assuming that the spread code C is a complex code made up of two quadrature codes $C_I$ and $C_Q$, the despread circuits $6_{k1}$ to $6_{kM}$ can be realized by one complex multiplier and averaging circuits over the symbol section. The despread circuits $6_{k1}$ to $6_{kM}$ can also be realized by a transversal filter arrangement with a tap weight C.

The weighting synthesizer 7 comprises complex multipliers $8_{k1}$ to $8_{kM}$ and adder 9. The weighting synthesizer 7 multiplies outputs from the despread circuits $6_{k1}$ to $6_{kM}$ by antenna weights $W_{rk1}$ to $W_{rkM}$, and adds them to generate a signal received with a directional pattern unique to a desired user.

The demodulator 10 comprises a transmission path estimation circuit 11 and complex multiplier 12. The product of an output from the weighting synthesizer 7 and the complex conjugate of a transmission path estimation output is the demodulated kth-sector signal as an output from the adaptive receiver $3_k$ of the kth sector.

The complex multiplier 13 multiplies the user determination symbol by the transmission path estimation output. In multiplying the user determination symbol by the transmission path estimation output, only a component about the phase of the estimation value can be multiplied, and an amplitude obtained by another means can be multiplied. This another means is one for obtaining the amplitude by measuring, e.g., reception power.

The subtracter 14 calculates the difference between an output from the complex multiplier 13 and an output from the weighting synthesizer 7, and detects an antenna weight control error $e_k$.

The delay circuit 15 delays outputs from the despread circuits $6_{k1}$ to $6_{kM}$ in accordance with the processing times of the weighting synthesizer 7, demodulator 10, subtracter 14, and the like.

The antenna weight control circuit 16 calculates the antenna weights $W_{rk1}$ to $W_{rkM}$ from the antenna weight control error $e_k$ and outputs from the delay circuit 15. The antenna weight control circuit 16 adaptively controls the antenna weights $W_{rk1}$ to $W_{rkM}$ based on the MMSE standard so as to minimize the mean square value of the antenna weight control error $e_k$. When the LMS algorithm is employed as an update algorithm with a small arithmetic amount, the antenna weights $W_{rk1}$ to $W_{rkM}$ are given by $$W_{rk}(i+1)=W_{rk}(i)+\mu r(i-D_{dem})e_k^*(i) \qquad (2)$$

where $W_{rk}(i)$ (column vector having M elements) is the antenna weight of the ith symbol, r(i) (column vector having M elements) is the antenna reception signal, $\mu$ is the step size, $D_{dem}$ is a delay time given by the delay circuit 15, and * is the complex conjugate. From equation (2), the antenna weights $W_{rk}$ to $W_{rkM}$ are updated every symbol. The step size $\mu$ as a change amount coefficient in updating the antenna weights $W_{rk1}$ to $W_{rkM}$ has the following feature. When the step size $\mu$ is large, the convergence speed to the antenna weights $W_{rk1}$ to $W_{rkM}$ for forming an optimum directional pattern is high, but the adaptive precision and stability are low; when the step size $\mu$ is small, the adaptive precision and stability are high, but the convergence speed is low. Thus, the step size is adaptively changed to obtain a satisfactory convergence speed, adaptive precision, and stability. This method is also incorporated in the present invention. The adaptive control convergence step may use a known symbol instead of the determination symbol.

The effects of the first embodiment according to the present invention will be explained. In the first embodiment of the present invention, since the antenna elements $2_{k1}$ to $2_{kM}$ are linearly laid out every sector, a directional pattern with a high reception gain substantially proportional to the number of antenna elements can be formed in a direction perpendicular to the linear layout of the antenna elements $2_{k1}$ to $2_{kM}$.

Since the directional pattern is independently formed for each sector, the number of antenna elements simultaneously adaptively controlled decreases. Even if the number of antenna elements increases, the adaptive convergence and stability are kept high in forming a directional pattern in a desired user direction.

The second embodiment of the present invention will be described in detail with reference to FIGS. 5 and 6. In this case, a multiplexed input signal is a code division multiple signal. The second embodiment will exemplify an array antenna reception apparatus (CDMA adaptive reception apparatus) for the number K (K is an integer of 3 or more) of sides (sectors) of a polygon in an antenna and the number M (M is an integer of 1 or more) of antenna elements in each sector.

Figure 5:
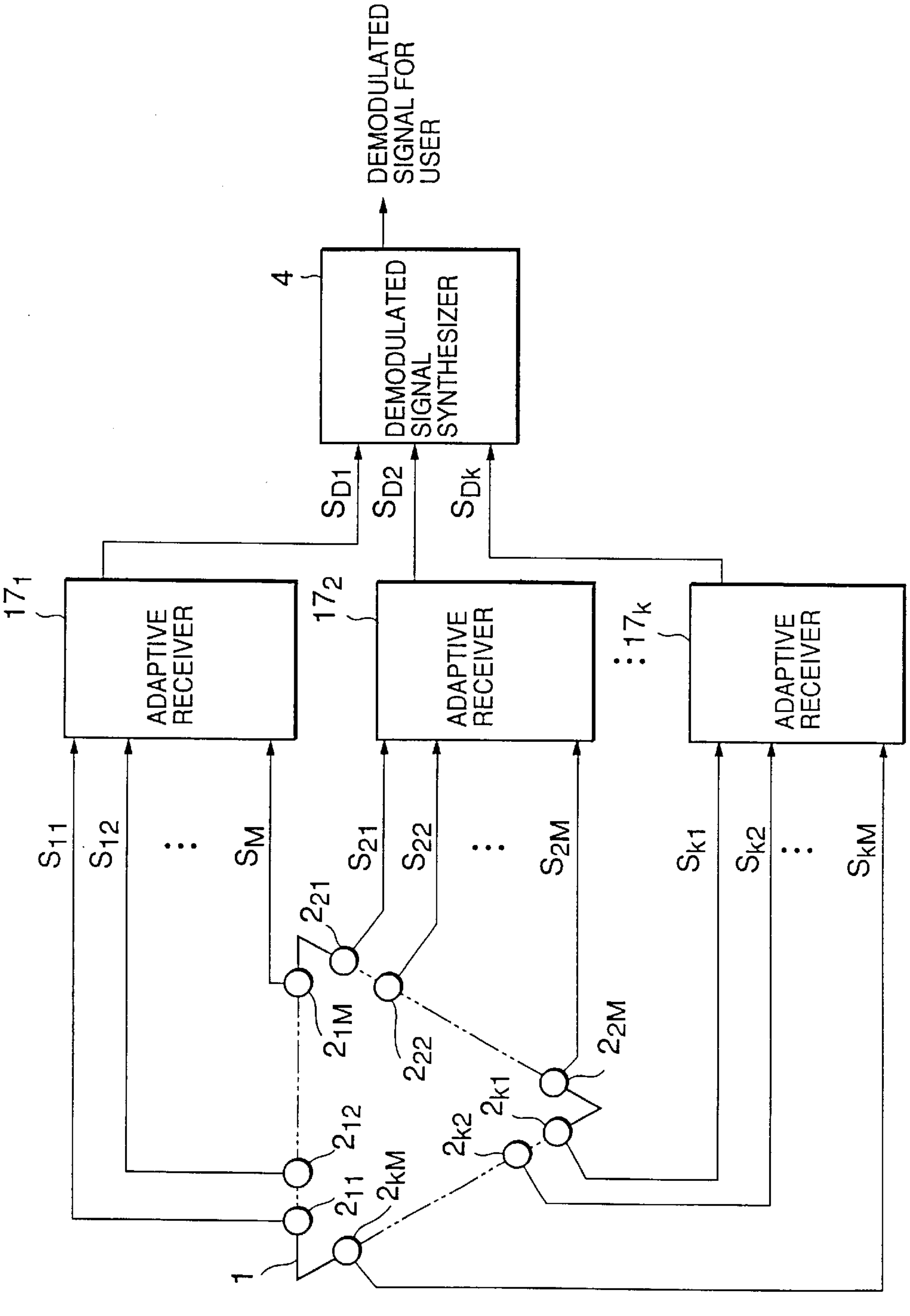
FIG. 5 is a block diagram showing the arrangement of an array antenna reception apparatus according to another embodiment of the present invention.

Referring to FIG. 5, the array antenna reception apparatus according to the present invention is constituted by an antenna 1, adaptive receivers $17_1$ to $17_K$, and demodulated signal synthesizer 4.

The antenna 1 is made up of antenna elements $2_{11}$ to $2_{KM}$ linearly laid out on respective sides (sectors) of a K-side polygon in units of M elements. The kth sector will be mainly described.

The antenna elements $2_{k1}$ to $2_{kM}$ in the kth sector are close to each other so as to establish correlations between antenna reception signals in the kth sector, and receive signals obtained by code-multiplexing desired signals and a plurality of interference signals. Each of the antenna elements $2_{k1}$ to $2_{kM}$ is not particularly limited in horizontal plane directivity, and desirably takes monopole directivity with a beam width of 180 degrees or less. When the antenna elements $2_{k1}$ to $2_{kM}$ take monopole directivity with a beam width of 180 degrees or less, they must be arranged to form directivity outside the polygon of the antenna 1. When the antenna elements $2_{k1}$ to $2_{kM}$ do not take monopole directivity with a beam width of 180 degrees or less (i.e., omnidirectivity or dipole directivity), a radio shielding member must be disposed inside the K-side polygon of the antenna 1 so as not to receive signals by the antenna elements $2_{k1}$ to $2_{kM}$ with directivity inside the kth side (kth sector) of the K-side polygon of the antenna 1. In the following processing, since signals are digitally processed in the baseband, M antenna reception signals k1 to kM received by the antenna elements $2_{k1}$ to $2_{kM}$ of the kth sector of the antenna 1 are frequency-converted from the radio band to the baseband and A/D-converted.

The demodulated signal synthesizer 4 receives K demodulated lst- to kth-sector signals as outputs from the adaptive receivers $17_1$ to $17_K$, weights and synthesizes them, and outputs a demodulated signal for a user. The weighting synthesis method in the demodulated signal synthesizer 4 is not particularly limited, and includes a method of selecting only a demodulated signal. having the maximum desired signal power, a method of selecting only a demodulated signal having the maximum ratio (SIR) of desired signal power to interference power, and a maximum ratio synthesizing method of maximizing the ratio of desired signal power to interference power.

Figure 6:
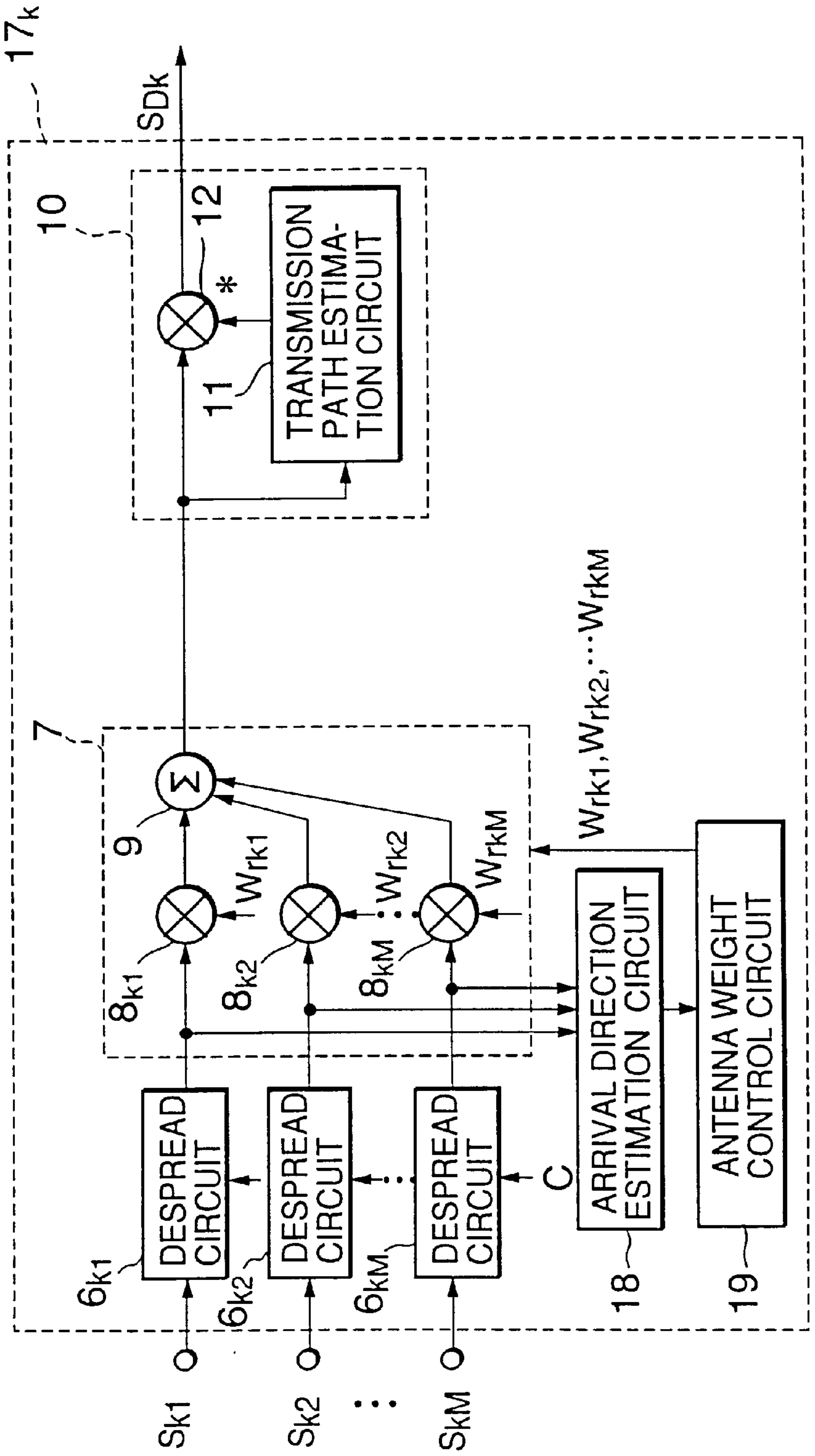
FIG. 6 is a block diagram showing the arrangement of an adaptive receiver in the embodiment shown in FIG. 5.

Referring to FIG. 6, the adaptive receiver $\mathbf{17}_K$ of the kth sector is constituted by despread circuits $\mathbf{6}_{k1}$ to $\mathbf{6}_{kM}$, weighting synthesizer 7, demodulator 10, arrival direction estimation circuit 18, and antenna weight generation circuit 19. The adaptive receiver $\mathbf{17}_K$ of the kth sector receives the antenna reception signals k1 to kM received by the M antenna elements $\mathbf{2}_{k1}$ to $\mathbf{2}_{kM}$ linearly laid out in one sector, and outputs a demodulated kth-sector signal.

The despread circuits $\mathbf{6}_{k1}$ to $\mathbf{6}_{kM}$ calculate correlations between the antenna signals k1 to kM and a user spread code C. Assuming that the spread code C is a complex code made up of two quadrature codes $C_I$ and $C_Q$, the despread circuits $\mathbf{6}_{k1}$ to $\mathbf{6}_{kM}$ can be realized by one complex multiplier and averaging circuits over the symbol section. The despread circuits $\mathbf{6}_{k1}$ to $\mathbf{6}_{kM}$ can also be realized by a transversal filter arrangement with a tap weight C.

The weighting synthesizer 7 comprises complex multipliers $\mathbf{8}_{k1}$ to $\mathbf{8}_{kM}$ and adder 9. The weighting synthesizer 7 multiplies outputs from the despread circuits $\mathbf{6}_{k1}$ to $\mathbf{6}_{kM}$ by antenna weights $W_{rk1}$ to $W_{rkM}$, and adds them to generate a signal received with a directional pattern unique to a desired user.

The demodulator 10 comprises a transmission path estimation circuit 11 and complex multiplier 12. The product of an output from the weighting synthesizer 7 and the complex conjugate of a transmission path estimation output is the demodulated kth-sector signal as an output from the adaptive receiver $\mathbf{17}_{k\ of}$ the kth sector.

The arrival direction estimation circuit 18 receives outputs from the despread circuits $\mathbf{6}_{k1}$ to $\mathbf{6}_{kM}$, and estimates the arrival direction of a desired signal from a reception signal multiplexed by a plurality of user signals. The arrival direction estimation method in the arrival direction estimation circuit 18 is not limited, and includes, e.g., the MUSIC method.

The antenna weight generation circuit 19 receives an estimated arrival direction signal as an output from the arrival direction estimation circuit 18, and calculates and outputs the antenna weights $W_{rk1}$ and $W_{rkM}$ for forming a directional pattern with the maximum reception gain in the estimated arrival direction.

The effects of the second embodiment according to the present invention will be explained. In the second embodiment of the present invention, an arrival direction is estimated in the adaptive receivers $\mathbf{17}_1$ to $\mathbf{17}_k$, and the antenna weights $W_{rk1}$ and $W_{rkM}$ are generated from the estimated arrival direction. In the first embodiment of the present invention, adaptive control is closed-loop control. To the contrary, in the second embodiment of the present invention, adaptive control is open loop control and thus can be stably done without any divergence.

The above embodiments of the present invention do not limit the code length of the spread code C, i.e., the spread ratio. The array antenna reception apparatus according to the present invention can be applied to even a signal multiplexed at a spread ratio of 1 by a method other than the code division multiple access method.

The above embodiments of the present invention do not limit the interval between antenna elements. For example, the interval is set to ½ the wavelength of the carrier wave.

The above embodiments of the present invention do not limit the number K of sectors. For example, the polygon is a triangle.

The above embodiments of the present invention do not limit the number M of antenna elements linearly laid out in one sector.

The above embodiments of the present invention do not limit the number of simultaneous reception users.

The above embodiments of the present invention do not limit the number of multipaths for simultaneous reception users.

What is claimed is:

1. An array antenna reception apparatus comprising: an array antenna having M antenna elements linearly laid out on each side of a polygon having K sides, M being an integer of not less than 1, K being an integer of not less than 3; K adaptive receivers each for receiving reception signals from the M antenna elements for a corresponding side, independently forming a directional pattern having a gain in a desired signal direction for the side, receiving a desired signal, and suppressing an interference signal; and a demodulated signal synthesizer for receiving K demodulated signals as outputs from said K adaptive receivers, weighting and synthesizing the signals, and outputting a demodulated signal for a user.

2. An apparatus according to claim 1, wherein the direction pattern of each side of said array antenna is formed outside each side of the polygon.

3. An apparatus according to claim 1, wherein said demodulated signal synthesizer selects a demodulated signal having maximum desired signal power in weighting and synthesizing the K demodulated signals.

4. An apparatus according to claim 1, wherein said demodulated signal synthesizer selects a demodulated signal having a maximum ratio of desired signal power to interference power in weighting and synthesizing the K demodulated signals.

5. An apparatus according to claim 1, wherein said demodulated signal synthesizer performs a weighting synthesis so as to maximize a ratio of desired signal power to interference power in weighting and synthesizing the K demodulated signals.

6. An apparatus according to claim 1, wherein each of said K adaptive receivers comprises:

M despread means for receiving code division multiple access (CDMA) signals received by said M antenna elements and a determination symbol obtained by a hard determination for the demodulated signal by a user, and despreading each of the M antenna reception signals using a desired user spread code, a weighting synthesizer for forming a directional pattern based on antenna weights, a demodulator for receiving the directional pattern and for estimating a transmission path, a multiplier for multiplying a user determination symbol by an output from said demodulator to cancel a phase change caused by phase lock of a carrier wave, a subtracter for subtracting an output from said weighting synthesizer from an output from said multiplier to detect an antenna weight control error, delay means for delaying outputs from said M spread means in accordance with a processing time of said demodulator, and antenna weight control means for controlling and outputting the antenna weights on the basis of a least mean square error (MMSE) so as to minimize average power of the antenna weight control error using outputs from said delay means and the antenna weight control error.

7. An apparatus according to claim 1, wherein each of said K adaptive receivers comprises:

M despread means for receiving code division multiple access (CDMA) signals received by said M antenna elements and despreading each of the M antenna reception signals using a desired user spread code, arrival direction estimation means for estimating an arrival direction from outputs from said M despread means, antenna weight generation means for generating antenna weights from outputs from said arrival direction estimation means, a weighting synthesizer for forming a directional pattern from the antenna weights, and a demodulator for receiving the directional pattern and for estimating a transmission path.

8. An apparatus according to claim 6, wherein said weighting synthesizer comprises M complex multipliers for receiving the M antenna reception signals and the antenna weights, and multiplying the received signals by M complex antenna weights, and an adder for adding outputs from said M complex multipliers.

9. An apparatus according to claim 6, wherein:

said demodulator comprises transmission path estimation means for receiving an output from said weighting synthesizer and estimating an amplitude and phase of the carrier wave, complex conjugate operation means for obtaining a complex conjugate of a complex transmission path estimation value as an output from said transmission path estimation means, and a multiplier for multiplying an output from said despread means by an output from said complex conjugate operation means phase-lock the carrier wave.

10. An antenna apparatus comprising:

an array antenna including M antenna elements disposed on each side of a K sided polygon, M being an integer equal or greater than one, K being an integer greater than 2, each antenna element effective to produce a respective antenna signal;

K adaptive receivers, each coupled to antenna elements on one respective side of the antenna array, each respective adaptive receiver receives the antenna signals from the respective side of the array and are effective to form a direction pattern having a gain in a desired signal direction for the respective side of the array antenna; and a demodulated signal synthesizer which receives the outputs from the adaptive receivers, weighs the outputs, synthesizes the outputs, and produces a demodulated signal.

11. The antenna apparatus as recited in claim 10, wherein the adaptive receivers are effective to suppress an interference signal.

12. The antenna apparatus as recited in claim 10, wherein the demodulated signal synthesizer produces the demodulated signal based on a particular output from a particular adaptive receiver which has the greatest signal power after being weighed and synthesized.

13. The antenna apparatus as recited in claim 10, wherein the demodulated signal synthesizer produces the demodulated signal based on a particular output from a particular adaptive receiver which has the greatest signal to noise ratio after being weighed and synthesized.

14. The antenna apparatus as recited in claim 10, wherein each adaptive receiver comprises:

M despreading circuits which each receive a respective antenna signal from a respective antenna element, each despreading circuit despreads the respective signal using a user spread code to produce respective despread signals;

a weighting synthesizer which receives the despread signals and produces a directional pattern based on antenna weights;

a demodulator which receives the directional pattern and estimates a transmission path in response thereto;

a multiplier which receives and multiplies a user determination symbol and an output of the demodulator to produce a phase change signal;

a subtractor which receives and subtracts the directional pattern from the phase change signal to produce an antenna weight error signal;

a delay circuit which receives and delays the respective despread signals to produce delayed despread signals; and an antenna weight control circuit which receives the delayed despread signals and the antenna weight error signal and outputs the antenna weights in response thereto.

* * * * *

UNITED STATES PATENT AND TRADEMARK OFFICE

CERTIFICATE OF CORRECTION

PATENT NO. : 6,792,033 B1
DATED : September 14, 2004
INVENTOR(S) : Yasushi Maruta et al.

It is certified that error appears in the above-identified patent and that said Letters Patent is hereby corrected as shown below:

<u>Title page,</u>
Item [56], References Cited, FOREIGN PATENT DOCUMENTS, insert:
-- JP 10-173580, 06/1998
JP 97-20400, 06/1997
JP 5-41607, 02/1993
JP 10-126138, 05/1998
JP 7-231286, 08/1995
JP 11-298388, 10/1999
JP 11-298345, 10/1999 --.

Signed and Sealed this

Thirty-first Day of January, 2006

JON W. DUDAS
*Director of the United States Patent and Trademark Office*